United States Patent
Fujisaki

(10) Patent No.: US 8,571,833 B2
(45) Date of Patent: Oct. 29, 2013

(54) FIELD DEVICE MAINTENANCE APPARATUS

(75) Inventor: Morihiro Fujisaki, Musashino (JP)

(73) Assignee: Yokoga Wa Electric Corporation, Tokyo (JP)

( * ) Notice: Subject to any disclaimer, the term of this patent is extended or adjusted under 35 U.S.C. 154(b) by 169 days.

(21) Appl. No.: 13/069,833

(22) Filed: Mar. 23, 2011

(65) Prior Publication Data

US 2011/0238375 A1  Sep. 29, 2011

(30) Foreign Application Priority Data

Mar. 24, 2010  (JP) ................................ 2010-067672

(51) Int. Cl.
*G06F 11/32* (2006.01)

(52) U.S. Cl.
USPC ........... 702/184; 702/116; 702/183; 702/187; 700/52; 700/83; 714/46

(58) Field of Classification Search
USPC .............. 702/116, 183, 184, 187; 700/52, 83; 714/46
See application file for complete search history.

(56) References Cited

U.S. PATENT DOCUMENTS

| | | | | |
|---|---|---|---|---|
| 6,633,782 | B1 * | 10/2003 | Schleiss et al. .................. | 700/26 |
| 8,060,862 | B2 * | 11/2011 | Eldridge et al. ............... | 717/121 |
| 8,145,358 | B2 * | 3/2012 | Miller ............................ | 700/281 |
| 2004/0070599 | A1 * | 4/2004 | Mori et al. ..................... | 345/735 |
| 2006/0173444 | A1 * | 8/2006 | Choy et al. ................. | 604/891.1 |
| 2007/0043539 | A1 * | 2/2007 | Niina et al. ..................... | 702/188 |
| 2007/0280287 | A1 * | 12/2007 | Samudrala et al. ........... | 370/466 |
| 2008/0091376 | A1 * | 4/2008 | Russell et al. ................ | 702/107 |
| 2008/0125879 | A1 * | 5/2008 | Miller .............................. | 700/30 |
| 2008/0188972 | A1 * | 8/2008 | Miller ........................... | 700/110 |
| 2008/0320402 | A1 * | 12/2008 | Isenmann et al. ............. | 715/762 |
| 2009/0177970 | A1 * | 7/2009 | Jahl et al. ....................... | 715/735 |
| 2009/0282296 | A1 * | 11/2009 | Lin ................................. | 714/46 |
| 2010/0085601 | A1 * | 4/2010 | Urakawa ...................... | 358/1.15 |
| 2010/0293495 | A1 * | 11/2010 | Hieb et al. ..................... | 715/772 |

FOREIGN PATENT DOCUMENTS

| | | |
|---|---|---|
| JP | 62-025421 A | 2/1987 |
| JP | 2002-268730 A | 9/2002 |
| JP | 2003-295943 A | 10/2003 |
| JP | 2006-252145 A | 9/2006 |

OTHER PUBLICATIONS

Japanese Office Action dated Feb. 3, 2012, issued in corresponding application No. 2010-067672, with English Translation.

* cited by examiner

*Primary Examiner* — Alexander H Taningco
*Assistant Examiner* — Paul D Lee
(74) *Attorney, Agent, or Firm* — Westerman, Hattori, Daniels & Adrian, LLP

(57) ABSTRACT

A field device maintenance apparatus includes a field device connection unit that communicates with a field device whose operation contents are defined by parameters; a work-information acquisition unit that acquires parameter attribute information including whether or not the individual parameters are displayable and work instruction information that shows work contents; a display unit that displays one or more of the parameters of the field device depending on whether or not the individual parameters are displayable according to the parameter attribute information; an operation accepting unit that accepts a changing operation for changing one or more of the parameters displayed by the display unit; and an operation-history-information recording unit that records a history of operations accepted by the operation accepting unit.

11 Claims, 5 Drawing Sheets

FIG. 3
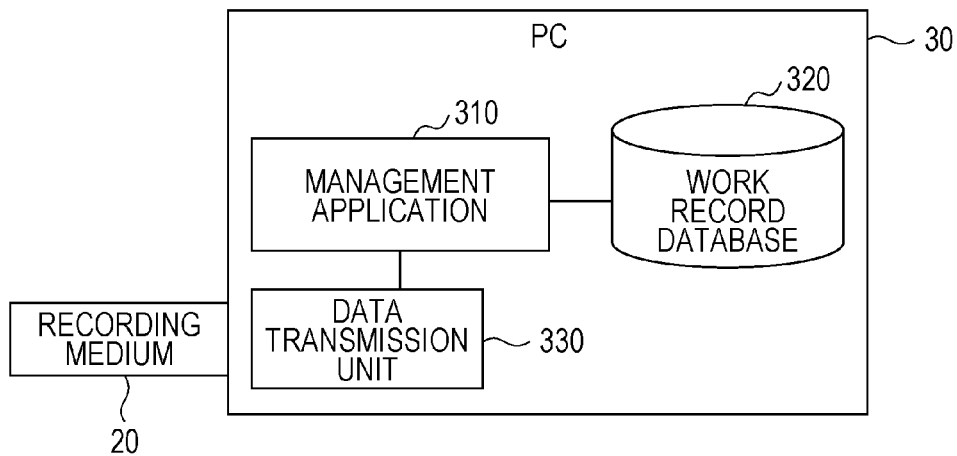
FIG. 4
| PARAMETER NAME | DISPLAY | CHANGEABLE |
|---|---|---|
| PARAMETER A | ✓ | ✓ |
| PARAMETER B | ✓ | |
| PARAMETER C | | ▓ |
| PARAMETER D | ✓ | ✓ |
| PARAMETER E | | ▓ |
FIG. 5
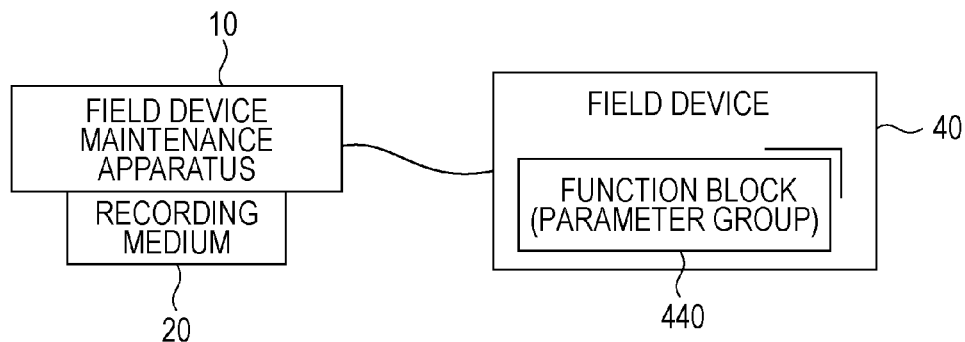

FIELD DEVICE MAINTENANCE APPARATUS

CROSS-REFERENCE TO RELATED APPLICATIONS

This application is based upon and claims the benefit of priority from the prior Japanese Patent Application No. 2010-067672, filed on Mar. 24, 2010, the entire content of which is incorporated herein by reference.

BACKGROUND

1. Field

An exemplary embodiment of the present invention relates to a field device maintenance apparatus that performs maintenance of a field device by changing parameters of the field device.

2. Related Art

Field devices, such as valves and sensors, are generally disposed in various sections of a plant.

Functions and operations of the field devices can be set via parameters. The field devices are subjected, as necessary, to maintenance in which the currently set parameters are changed or corrected.

In related art, maintenance of a field device is performed by carrying out the following procedure. First, a manager gives work instructions to a worker in charge. The manager issues the work instructions by inputting an instruction to a maintenance tool or handing a work instruction document to the worker in charge.

The worker in charge goes to a work site with the maintenance tool and connects the maintenance tool to the field device to be subjected to maintenance. Then, the parameters of the field device are displayed on the maintenance tool. The worker in charge finds a parameter to be changed in accordance with the work instructions and sets the parameter. This process is performed for all the parameters that are to be changed, and then the maintenance tool is disconnected from the field device.

Subsequently, the worker in charge writes a report regarding the work contents and submits the report to the manager. The manager files the work report or saves it as electronic data.

Japanese Unexamined Patent Application Publications Nos. 2006-252145 and 2003-295943 are some examples in the related art field.

When the field device maintenance tool according to the above examples in the related art field is connected to a field device, the maintenance tool displays all the parameters of the field device. Therefore, the worker in charge must refer to the work instructions, determine the parameters to be changed, and find the parameters to be changed from among all the parameters that are displayed. This is not only cumbersome but also requires knowledge of the specification of the field device to prevent parameters, which need not be changed, from being changed by mistake. Recently, with increasing functionality of field devices, the number of parameters of the field devices has been increasing. Accordingly, the above-mentioned problems have become much more significant because they impose a heavy burden on the worker in charge in writing the work report for the manager.

SUMMARY

The following presents a summary of some aspects of the invention. This summary is not an extensive overview but is intended to identify key elements of the invention or to delineate the scope of the invention. Its sole purpose is to present some concepts of the invention in a simplified form as a prelude to the more detailed description that is presented later.

Accordingly, an object of an embodiment of the present invention, for example, is to provide a field device maintenance apparatus that places less burden on the worker in charge.

To solve the above-described problems, according to an exemplary embodiment, a field device maintenance apparatus includes a field device connection unit that communicates with a field device whose operation contents are defined by a plurality of parameters; a work-information acquisition unit that acquires parameter attribute information including whether or not the individual parameters are displayable and work instruction information that shows work contents; a display unit that displays one or more of the parameters of the field device depending on whether or not the individual parameters are displayable according to the parameter attribute information; an operation accepting unit that accepts a changing operation for changing one or more of the parameters displayed by the display unit; and an operation-history-information recording unit that records a history of operations accepted by the operation accepting unit.

According to the field device maintenance apparatus of an embodiment of the present invention, among the parameters of the field device, only the parameters set to be displayable are displayed. Therefore, the worker in charge does not have to find the parameters to be changed from among all the parameters. This reduces the burden on the worker.

The parameter attribute information may include whether or not the individual parameters are changeable. The operation accepting unit does not accept the changing operation for one or more of the parameters that are set to be unchangeable.

In this case, the parameters which need not be changed can be prevented from being changed by the worker in charge by mistake.

The work-information acquisition unit may acquire the parameter attribute information and the work instruction information from a portable recording medium. In such a case, the manager and the worker in charge can simply exchange information by using the recording medium.

In this case, the operation-history-information recording unit may record the history of the operation on the portable recording medium.

In addition, the operation accepting unit may stop accepting the changing operation for the parameters when the operation accepting unit is informed that the changing operation for changing the parameters has been completed.

Therefore, an example of the present invention described above provides a field device maintenance apparatus that places less burden on the worker in charge.

The above and/or other aspects, features and/or advantages of embodiments will be further appreciated in view of the following description in conjunction with the accompanying figures. These embodiments can include and/or exclude different aspects, features and/or advantages where applicable. In addition, embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and other features and advantages of aspects of the present invention will become more apparent by describing in detail exemplary embodiments thereof with reference to the attached drawings in which:

FIG. 3 is a block diagram illustrating the structure of a manager PC;

FIG. 4 is a diagram illustrating an example of an edit screen for setting parameter attributes;

FIG. 5 is a block diagram illustrating the state in which the field device maintenance apparatus is connected to a field device;

DETAILED DESCRIPTION

While the present invention may be embodied in many different forms, a number of illustrative aspects of an embodiment are described herein with the understanding that the present disclosure is to be considered as providing examples of the principles of the invention and that such examples are not intended to limit the invention to aspects described herein and/or illustrated herein.

Figure 1A:
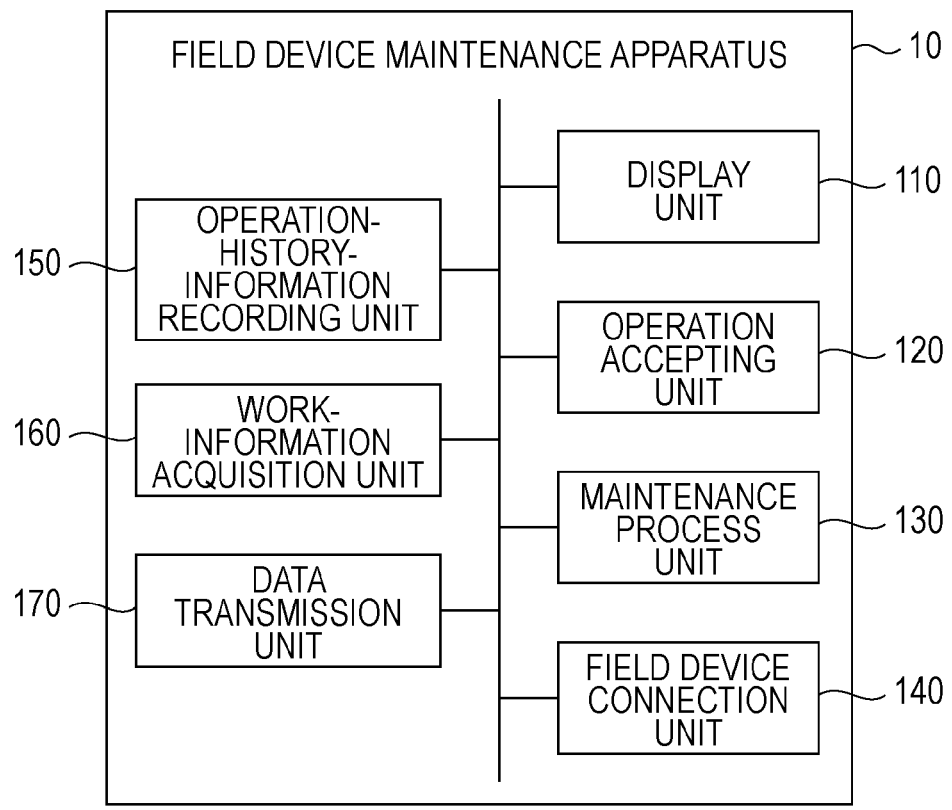
FIG. 1A is a block diagram illustrating the structure of a field device maintenance apparatus according to an embodiment.
Figure 1B:
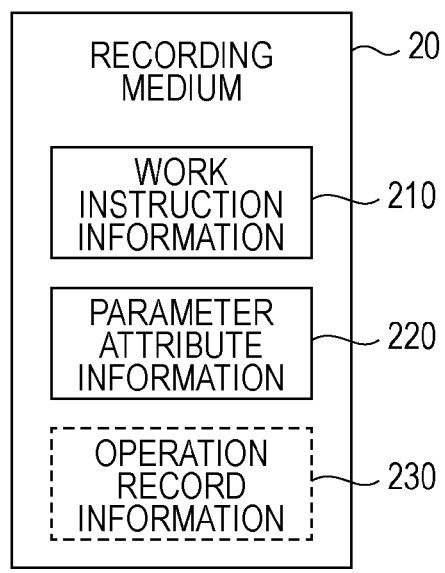
FIG. 1B is a block diagram illustrating the structure of a recording medium according to the embodiment.

An example of an embodiment of the present invention will be described with reference to the drawings. FIGS. 1A and 1B are block diagrams illustrating the structures of a field device maintenance apparatus 10 and a recording medium according to an embodiment. In this embodiment, the field device maintenance apparatus 10 can read and write information from and to the recording medium 20, which is portable. The field device maintenance apparatus 10 reads work instruction information 210 and parameter attribute information 220 recorded in the recording medium 20 and writes operation record information 230 to the recording medium 20. A memory card, a Secure Digital (SD) card (trademark), a universal serial bus (USB) memory, and other portable recording media may be used as the portable recording medium 20.

As illustrated in FIG. 1A, the field device maintenance apparatus 10 includes a display unit 110, an operation accepting unit 120, a maintenance process unit 130, a field device connection unit 140, an operation-history-information recording unit 150, a work-information acquisition unit 160, and a data transmission unit 170.

The display unit 110 includes a display device, and displays parameters of a field device to which the field device maintenance apparatus 10 is connected and contents of work instructions. The operation accepting unit 120 includes key buttons, switches, etc., and accepts an operation from the worker in charge. The field device connection unit 140 provides a connection with the field device. The data transmission unit 170 is connected to the recording medium 20 and performs a data reading-and-writing process.

The maintenance process unit 130 is a control unit that controls various processes performed by the field device maintenance apparatus 10. More specifically, the maintenance process unit 130 acquires parameters from the connected field device and accepts changes thereof from the worker in charge. Then, the maintenance process unit 130 performs a process of setting the changed parameters in the field device. In this process, the maintenance process unit 130 refers to the parameter attribute information 220 read from the recording medium 20, displays the parameters in accordance with the attributes thereof set by the manager, and accepts the changes of parameters.

The control circuit may comprise a central processing unit (CPU), a computer, a computer unit, a data processor, a microcomputer, microelectronics device, or a microprocessor to implement the above-described functionality.

The operation-history-information recording unit 150 records the history of operations accepted by the operation accepting unit 120 from the worker in charge as the operation record information 230 in the recording medium 20. The work-information acquisition unit 160 reads the work instruction information 210 and the parameter attribute information 220 from the recording medium 20.

Figure 2:
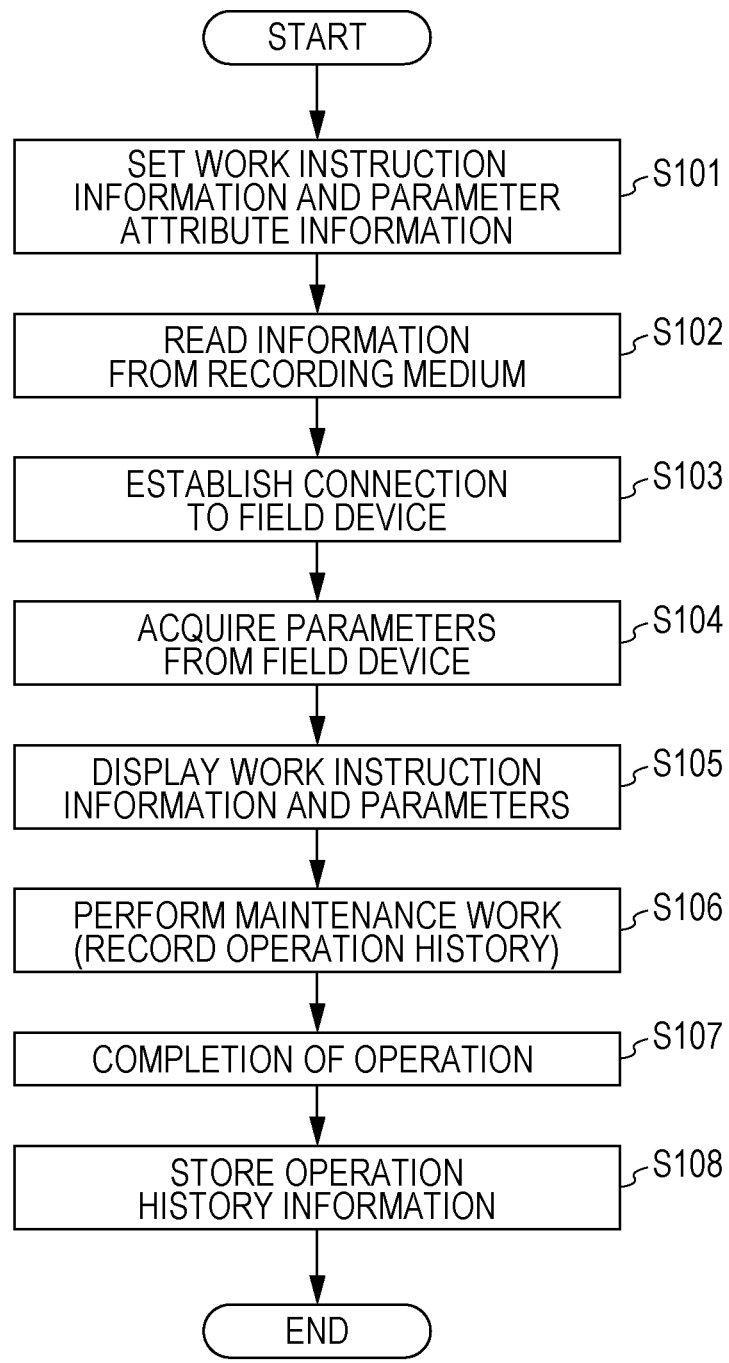
FIG. 2 is a flowchart of the procedure of a field device maintenance process according to the embodiment.

The procedure of the field device maintenance process according to the present embodiment will now be described with reference to the flowchart shown in FIG. 2. In the field device maintenance process according to the present embodiment, first, the manager sets work instruction information and parameter attribute information, and records them as the work instruction information 210 and the parameter attribute information 220 in the recording medium 20 (S101).

The work instruction information 210 and the parameter attribute information 220 are recorded in the recording medium 20 by using the structure illustrated in the block diagram of FIG. 3. As illustrated in FIG. 3, the manager prepares a management application 310, a work record database 320, and a data transmission unit 330 in a manager personal computer (PC) 30.

The data transmission unit 330 is connected to the recording medium 20, and performs a data reading-and-writing process. The management application 310 has a function of presenting an edit screen for inputting work instructions and an edit screen for setting parameter attributes to the manager; a function of writing the work instructions input by the manager and the parameter attributes set by the manager as the work instruction information 210 and the parameter attribute information 220, respectively, in the recording medium 20; and a function of reading the operation record information 230 from the recording medium 20 and recording the operation record information 230 in the work record database 320.

FIG. 4 is a diagram illustrating an example of the edit screen for setting the parameter attributes. As illustrated in FIG. 4, in the edit screen for setting the parameter attributes, "DISPLAY" and "CHANGEABLE" can be set for each of the parameters of the field device that is to be subjected to maintenance. To display this edit screen, the management application 310 is provided with parameter lists which correspond to the individual field devices. The parameter lists are stored inside or outside the management application 310, and can be referred to as necessary.

Here, the parameters for which "DISPLAY" is checked are displayed on the display screen of the field device maintenance apparatus 10 when the field device maintenance apparatus 10 is connected to the field device. The parameters for which both "DISPLAY" and "CHANGEABLE" are checked are set to be changeable by the field device maintenance apparatus 10.

Accordingly, the manager checks both "DISPLAY" and "CHANGEABLE" for the parameters that are to be changed. In addition, the manager checks only "DISPLAY" for the parameters that are not to be changed but are to be displayed as a reference. Neither "DISPLAY" nor "CHANGEABLE" is checked for the parameters that are irrelevant to the work, so that the parameters are not displayed. Accordingly, the worker in charge does not have to find parameters necessary for the maintenance work.

In this embodiment, the cells in the "CHANGEABLE" column that correspond to the parameters for which "DISPLAY" is not checked are grayed, and are set to a checkable state when "DISPLAY" is checked. Thus, each parameter is prevented from being set such that only "CHANGEABLE" is checked.

Referring to the flowchart of FIG. 2 again, the manager hands the recording medium 20 in which the work instruction information 210 and the parameter attribute information 220 are recorded to the worker in charge. The worker in charge attaches the recording medium 20 to the field device maintenance apparatus 10 and causes the field device maintenance apparatus 10 to read the information recorded in the recording medium 20 (S102).

Then, the worker in charge connects the field device maintenance apparatus 10 to the field device at the work site (S103). FIG. 5 is a block diagram illustrating the state in which the field device maintenance apparatus 10 is connected to a field device 40.

Referring to FIG. 5, the field device 40 includes one or more function blocks 440 as units of signal processing. There are various types of function blocks 440, such as analog input (AI), analog output (AO), proportional integral differential (PID) control (PID), and device control (DC). Each function block 440 has a parameter for setting the operation of the function block 440.

When the field device maintenance apparatus 10 to which the recording medium 20 is attached is connected to the field device 40, the field device maintenance apparatus 10 acquires parameters set for the individual function blocks 440 from the field device 40 (S104).

The field device maintenance apparatus 10 displays the work instruction information recorded in the recording medium 20 and the parameters acquired from the field device 40 on the display device included in the display unit 110 in accordance with the operation performed by the worker in charge (S105).

Figure 6:
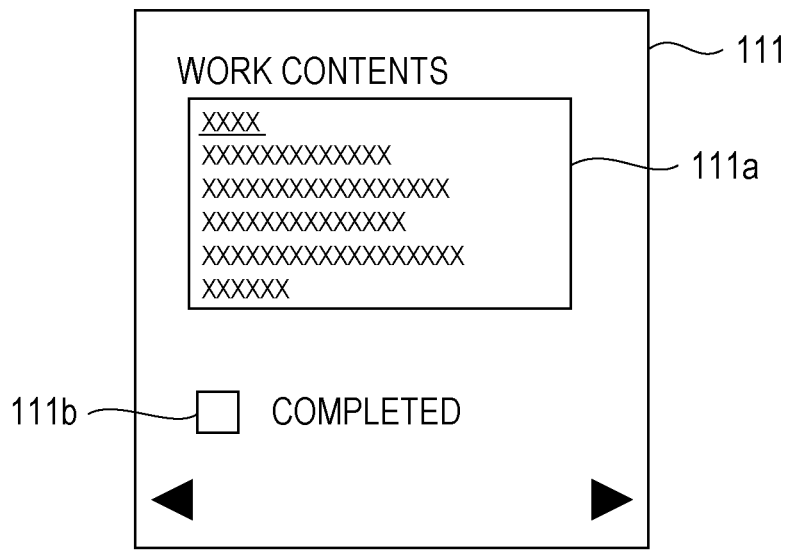
FIG. 6 is a diagram illustrating an example of a display screen for displaying work instruction information.

FIG. 6 is a diagram illustrating an example of a display screen for displaying the work instruction information. Referring to FIG. 6, a work-instruction-information display screen 111 includes a work-content display field 111a for displaying the work contents set by the manager and a completion check box 111b for informing the field device maintenance apparatus 10 that the work has been completed.

The worker in charge checks the completion check box 111b when the work listed in the work-content display field 111a is completed.

Figure 7:
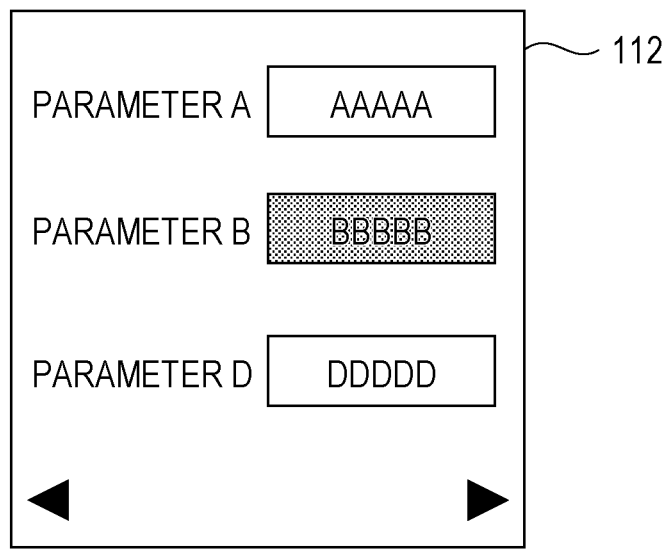
FIG. 7 is a diagram illustrating an example of a display screen for displaying parameters.

FIG. 7 is a diagram illustrating an example of a display screen for displaying parameters. As illustrated in FIG. 7, the parameters acquired from the field device 40 by the field device maintenance apparatus 10 are displayed on a parameter display screen 112.

To display the parameters, the field device maintenance apparatus 10 refers to the parameter attribute information 220 in the recording medium 20 and displays the parameter display screen 112. More specifically, among the parameters acquired from the field device 40, the parameters for which "DISPLAY" is not set are not displayed on the parameter display screen 112. Accordingly, only the parameters necessary for the maintenance work are displayed on the parameter display screen 112. This increases the work efficiency of the worker in charge.

Among the parameters displayed on the parameter display screen 112, the parameters for which "CHANGEABLE" are set such that the parameters can be changed by the worker in charge, and the parameters for which "CHANGEABLE" is not set are merely displayed and are set such that parameters cannot be changed by the worker in charge. Thus, the parameters which need not be changed can be prevented from being changed by the worker in charge by mistake.

When the completion check box 111b on the work-instruction-information display screen 111 is checked by the worker in charge, the field device maintenance apparatus 10 sets the parameters listed on the parameter display screen 112 to be unchangeable. Thus, the parameters which need not be changed can be prevented from being changed after the completion of the work by mistake.

In the example illustrated in FIG. 7, among the parameters of the field device 40, "PARAMETER A", "PARAMETER B", and "PARAMETER D", for which "DISPLAY" is set in the parameter attribute information 220, are displayed on the parameter display screen 112. In addition, "PARAMETER A" and "PARAMETER D", for which "CHANGEABLE" is set, are set to be changeable, and "PARAMETER B", for which "CHANGEABLE" is not set, is grayed and is set to be unchangeable.

The worker in charge performs the maintenance work by changing the parameters displayed on the parameter display screen 112 in accordance with the work contents displayed in the work-content display field 111a (S106). The operation-history-information recording unit 150 records contents of operations performed by the worker in charge during the maintenance work and stores the operation contents as the operation record information 230 in the recording medium 20. At this time, not only the results of parameter changes but all the operations performed are preferably recorded.

In addition, the maintenance process unit 130 reflects the changes of parameters accepted from the worker in charge during the maintenance work to the parameters set in the function blocks 440 of the field device 40.

When all the maintenance work listed in the work-content display field 111a is completed, the worker in charge checks the completion check box 111b (S107). Accordingly, the parameters are set to be unchangeable. In addition, the operation-history-information recording unit 150 stops recording the operation history.

The worker in charge disconnects the field device maintenance apparatus 10 from the field device 40, detaches the recording medium 20, and hands the recording medium 20 to the manager.

The manager attaches the recording medium 20 received from the worker in charge to the manager PC 30 and activates the management application 310. The management application 310 reads the operation record information 230 from the recording medium 20 and stores the operation record information 230 in the work record database 320 (S108).

Thus, the work records are accumulated in the work record database 320. The manager can check the contents of the maintenance work by referring to the work record database 320, and it is not necessary for the worker in charge to write a work report. Basically, the manager and the worker in charge can simply hand the recording medium 20 to each other.

As described in the example above, by using the field device maintenance apparatus 10 according to the exemplary embodiment, the burden on the worker in charge who performs maintenance of the field device can be reduced. The field device maintenance apparatus 10 according to the exemplary embodiment can be effectively applied to the case in which the same maintenance work is performed for a plurality of field devices.

The worker in charge is required simply to perform the work listed in the recording medium 20. Therefore, the work contents are clarified and the work is simplified. In addition, the manager can easily issue the instructions to the worker in charge and manage the work reports.

Figure 8:
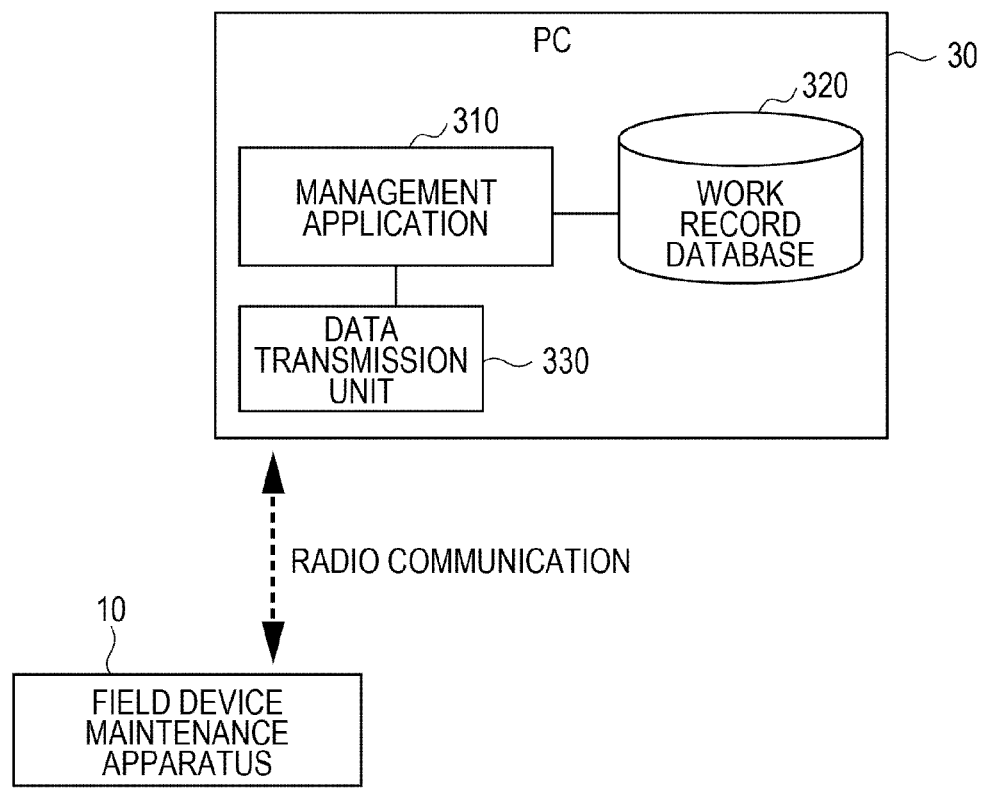
FIG. 8 is a block diagram illustrating the structure for wireless information communication which does not use the recording medium.

In the above-described embodiment, the field device maintenance apparatus 10 and the manager PC 30 communicate information with each other via the recording medium 20. However, as illustrated in FIG. 8, the information can be transmitted by radio without using the recording medium 20. The radio communication may be provided by Bluetooth (trademark), infrared-ray communication, non-contact IC chips, and other radio systems. Alternatively, wire communications using, for example, a universal serial bus (USB), may be used.

The present invention is not limited to the above-described embodiment, and may be applied in various embodiments. For example, the present invention can be applied to apparatuses that perform maintenance of general devices instead of the field devices. In addition, the recording medium 20 may be provided for each worker in charge or each area of which the worker is in charge. In such a case, the work contents for each worker in charge can be clarified.

BROAD SCOPE OF THE INVENTION

While illustrative aspects of the invention have been described herein, the present invention is not limited to the various aspects described herein, but includes any and all aspect in an embodiment having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc.

What is claimed is:

1. A field device maintenance system, comprising:
a field device maintenance apparatus that performs maintenance of a field device whose operation contents are defined by a plurality of parameters, wherein the field device maintenance apparatus performs maintenance of the field device by changing a parameter in the field device; and
a manager device,
wherein the manager device accepts setting of parameter attribute information including whether or not individual parameters provided in the field device to be maintained are displayable by the field device maintenance apparatus, and accepts input of work instruction information that shows work contents, and
wherein the field device maintenance apparatus comprises:
a field device connection unit that communicates with the field device;
a work-information acquisition unit that acquires the parameter attribute information and the work instruction information which are accepted by the manager device;
a display unit that displays one or more of the parameters of the field device depending on whether or not the individual parameters are displayable according to the parameter attribute information;
an operation accepting unit that accepts a changing operation for changing in the field device the one or more of the parameters displayed by the display unit; and
an operation-history-information recording unit that records a history of operations accepted by the operation accepting unit; and
wherein the parameter attribute information includes whether or not the individual parameters are changeable, and
wherein the manager device is configured to accept setting of an attribute as changeable only for one or more of the parameters that are set to be displayable, and
the operation accepting unit of the field device maintenance apparatus is configured not to accept the changing operation for one or more of the parameters that are set to be unchangeable.

2. The field device maintenance system according to claim 1, wherein the manager device records the parameter attribute information and the work instruction information thus accepted on a portable recording medium, and the work-information acquisition unit of the field device maintenance apparatus acquires the parameter attribute information and the work instruction information from a portable recording medium.

3. The field device maintenance system according to claim 2, wherein the operation-history-information recording unit of the field device maintenance apparatus records the history of the operations on the portable recording medium, and
the manager device reads out the history of the operations from the portable recording medium and stores the history.

4. The field device maintenance system according to claim 3, wherein the operation accepting unit of the field device maintenance apparatus stops accepting the changing operation for the parameters when the operation accepting unit is informed that the changing operation for changing the parameters has been completed.

5. The field device maintenance system according to claim 2, wherein the operation accepting unit of the field device maintenance apparatus stops accepting the changing operation for the parameters when the operation accepting unit is informed that the changing operation for changing the parameters has been completed.

6. The field device maintenance system according to claim 1, wherein the manager device records the parameter attribute information and the work instruction information thus accepted on a portable recording medium, and the work-information acquisition unit of the field device maintenance apparatus acquires the parameter attribute information and the work instruction information from a portable recording medium.

7. The field device maintenance system according to claim 6, wherein the operation-history-information recording unit of the field device maintenance apparatus records the history of the operations on the portable recording medium, and the manager device reads out the history of the operations from the portable recording medium and stores the history.

8. The field device maintenance system according to claim 7, wherein the operation accepting unit of the field device maintenance apparatus stops accepting the changing operation for the parameters when the operation accepting unit is informed that the changing operation for changing the parameters has been completed.

9. The field device maintenance system according to claim 6, wherein the operation accepting unit of the field device maintenance apparatus stops accepting the changing operation for the parameters when the operation accepting unit is informed that the changing operation for changing the parameters has been completed.

10. The field device maintenance system according to claim 1, wherein the operation accepting unit of the field device maintenance apparatus stops accepting the changing operation for the parameters when the operation accepting unit is informed that the changing operation for changing the parameters has been completed.

11. The field device maintenance system according to claim 1, wherein the operation accepting unit of the field device maintenance apparatus stops accepting the changing operation for the parameters when the operation accepting unit is informed that the changing operation for changing the parameters has been completed.

* * * * *